United States Patent
Furtwangler et al.

(10) Patent No.: US 10,635,745 B2
(45) Date of Patent: Apr. 28, 2020

(54) PRE-CHILDREN IN A USER INTERFACE TREE

(71) Applicant: Home Box Office, Inc., New York, NY (US)

(72) Inventors: Brandon C. Furtwangler, Issaquah, WA (US); Brendan Joseph Clark, Seattle, WA (US); J. Jordan C. Parker, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 148 days.

(21) Appl. No.: 15/971,378

(22) Filed: May 4, 2018

(65) Prior Publication Data
US 2018/0253407 A1 Sep. 6, 2018

Related U.S. Application Data

(63) Continuation of application No. 14/843,798, filed on Sep. 2, 2015, now Pat. No. 9,965,452.

(60) Provisional application No. 62/046,134, filed on Sep. 4, 2014.

(51) Int. Cl.
G06F 17/00 (2019.01)
G06F 17/22 (2006.01)
G06F 9/451 (2018.01)

(52) U.S. Cl.
CPC .......... *G06F 17/2247* (2013.01); *G06F 9/451* (2018.02)

(58) Field of Classification Search
CPC .............................. G06F 3/0482; G06F 3/048
See application file for complete search history.

(56) References Cited

U.S. PATENT DOCUMENTS

| 6,144,377 | A | 11/2000 | Oppermann et al. |
| 6,812,941 | B1 | 11/2004 | Brown et al. |
| 7,200,819 | B2 | 4/2007 | Bells et al. |
| 7,543,278 | B2 | 6/2009 | Klementiev |
| 7,692,658 | B2 * | 4/2010 | Moore .................... G06T 13/80 345/473 |
| 8,296,326 | B1 * | 10/2012 | Ivaciov ................... H04L 41/22 707/797 |
| 8,694,900 | B2 | 4/2014 | Bishop et al. |

(Continued)

OTHER PUBLICATIONS

Teevan et al., "Changing How People View Changes on the Web," UIST '09, Oct. 2009, Copyright 2009 ACM, p. 237-246. (Year: 2009).*

(Continued)

*Primary Examiner* — Amelia L Tapp
(74) *Attorney, Agent, or Firm* — Amin, Turocy & Watson, LLP

(57) ABSTRACT

The described technology is directed towards a pre-child user interface element in a user interface tree that draws before the parent element draws, (and thus before any conventional child element of the parent draws). For example, based upon current state data such as whether the parent element has focus, the pre-child may draw a highlight or the like before (so as to be beneath) drawing the representation of the parent element, to indicate the focused state (or and/or other current state or states). The user interface tree maintains a property that it is composable because the parent user interface element code is independent of what any of its pre-child element or pre-children elements do when invoked.

20 Claims, 11 Drawing Sheets

(56) References Cited

U.S. PATENT DOCUMENTS

| | | |
|---|---|---|
| 8,786,517 B2 | 7/2014 | Lewin et al. |
| 9,239,662 B2 | 1/2016 | Matas et al. |
| 2001/0048448 A1 | 12/2001 | Raiz et al. |
| 2008/0120543 A1* | 5/2008 | Cahill .................... G06F 11/32 715/700 |
| 2013/0214995 A1 | 8/2013 | Lewin et al. |

OTHER PUBLICATIONS

Colombian Office Action for Colombian Application Serial No. NC2017/0003247 dated Oct. 17, 2018, 28 pages (with English translation).
International Search Report and Written opinion from International Patent Application Serial No. PCT/US2015/048413, dated Nov. 30, 2015, 11 pages.
Colombian Office Action for Colombian Application Serial No. NC2017/0003247 dated Apr. 11, 2017, 6 pages.
Non-Final Office Action received for U.S. Appl. No. 14/843,798 dated Jun. 26, 2017, 31 pages.
Notice of Allowance received for U.S. Appl. No. 14/843,798 dated Jan. 4, 2018, 30 pages.
Perlin et al., "Nested User Interface Components" CHI Letters vol. 1, USIT '99, Asheville, NC 1999, copyright ACM, p. 11-18.
Communication pursuant to Rules 161(1) and 162 EPC for EP Application Serial No. 15775838.4 dated Apr. 11, 2017, 2 pages.
Communication pursuant to Article 94(3) for EP Application Serial No. 15775838.4 dated May 16, 2018, 3 pages.
Colombian Office Action for Colombian Application Serial No. NC2017/0003247 dated Mar. 11, 2019 32 pages (with English translation).
Communication pursuant to Article 94(3) EPC received for EP Patent Application Serial No. 15775838 dated Nov. 26, 2019, 4 pages.

* cited by examiner

PRE-CHILDREN IN A USER INTERFACE TREE

CROSS-REFERENCE TO RELATED APPLICATION

The present application claims priority to copending U.S. patent application Ser. No. 14/843,798, filed Sep. 2, 2015, which claims priority to U.S. provisional patent application Ser. No. 62/046,134, filed Sep. 4, 2014.

BACKGROUND

A user interface (UI) of an application program often has hundreds or thousands of elements that when rendered are combined in complex ways to provide a (hopefully) visually appealing user experience that is also straightforward and consistent to use. During program running, it is common to organize UI into a tree structure, in which each element of such a tree has at most one parent element and zero or more child elements.

To draw the UI tree, it is common to perform a pre-order traversal, where an element draws, and then each of its children elements draw in order, recursively. This type of traversal establishes a z-order such that when drawn using a painter's algorithm, a UI element's children are visually on top of the parent UI element's own drawing.

For example, a UI designer may want to have a rectangular blue button that contains some black text (e.g., "Click Me"). The designer arranges the elements such that the parent element draws a blue rectangle and then a child text element draws the black text string over (positioned within) that blue rectangle. Structuring the UI tree with the child text element decoupled in this way from the parent button element provides a useful property in that the tree is composable. For example, because the text is decoupled from the button, the designer may instead have the button contain an image (by having an Image UIElement as the child) instead of the text, or may have both an image (one child) and text (another child) drawn in the same button. If the elements are objects containing logic/code, (that is, at least the button element), the logic/behavior configured in the button element's code is unchanged.

However, consider that the button element is given focus (e.g., via a keyboard, game controller, mouse or the like), and the designer wants to change the way that the button element is presented to the user to reflect this focused state, such as by drawing an orange oval behind the button to highlight the button's appearance when focused. In this situation, the highlighted oval does not share the property of being composable, because the button (rendered as the blue rectangle) needs to know the appearance of its highlight (the orange oval) so that the orange oval can be drawn prior to drawing the button's own blue rectangle appearance.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards having one or more pre-children user interface elements in the user interface tree that may draw before their parent user interface element draws. A parent user interface element invokes any pre-child user interface element. Each pre-child may include pre-child logic for drawing a representation of the pre-child user interface element at a first time, which is before a second time in which a representation of a parent user interface element is drawn. The pre-child logic may determine whether to draw the pre-child representation based upon current state data, e.g., as a highlight when the current state data indicates that the parent user interface element has focus.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

Figure 1:
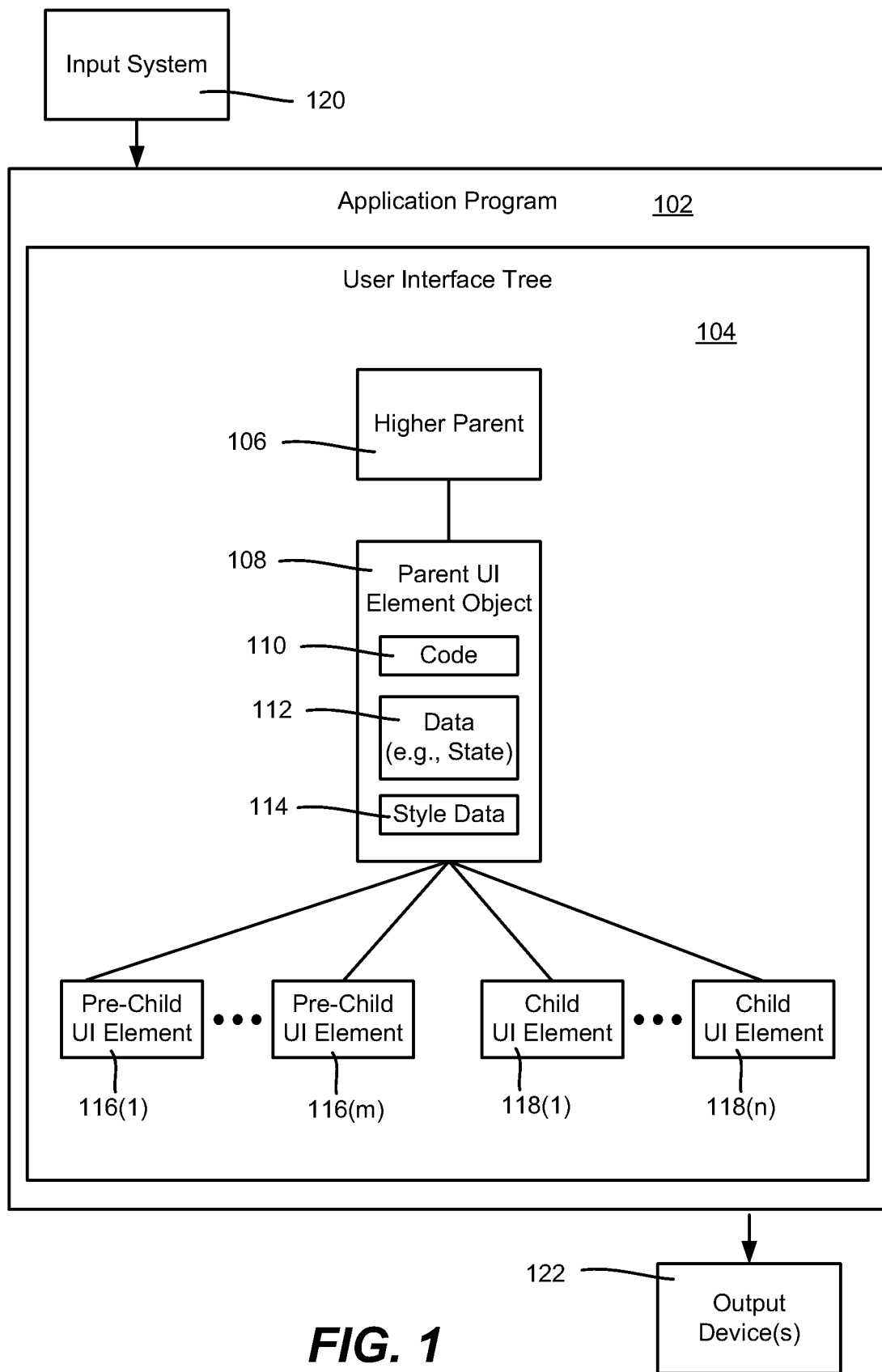
FIG. 1 is a block diagram showing an example configuration of components that may be used to provide pre-children in a user interface (UI) tree of an application program, according to one or more example implementations.

The technology described herein is directed towards having a parent element with one or more children elements, referred to as a "pre-child" element or pre-children elements, that draw before the parent element draws, unlike conventional children that are drawn after the parent draws. As will be understood, pre-child technology provides decoupled user interface elements in the user interface tree that represent different visual properties, such as a focus highlight or the like, that draw before the parent draws, and thus provide the composable property. Note that as used herein, a "highlight" as "drawn" may be any visible, audible and/or tactile rendering of output, such as a two-dimensional shape (e.g., any polygon) that conveys a certain state of a user interface element to a user, e.g., focused, non-focused, hovered, selected and so on; (various example states are described herein).

In general, as described herein a parent user interface element may maintain two sets of children, namely one set (containing one or more pre-children) that draws before the parent user interface element draws, and another set (containing one or more children) that draw after the parent user interface element draws. As a result, a parent user interface element can render itself after (upon) a pre-child. For example, while in focus the parent user interface element (blue rectangle) may render itself over a pre-child element (orange oval) to highlight the focused state; however because the pre-child is composable, the orange oval element may be replaced with another element, e.g., a red circle, by changing the pre-child in the user interface tree. While not in focus, the "focus state" pre-child is not drawn (or draws as invisible).

Further, a different pre-child may be used in another state. For example, a different "hovered state" pre-child may be drawn before the parent button draws when the parent button is in the hovered state (e.g., a mouse pointer is hovering above it). Alternatively, the same pre-child may draw itself differently in different states, e.g., not at all or invisibly when not focused or hovered, as a green triangle when hovered but not focused, as an orange oval when focused, and as a green triangle beneath an orange oval when focused and hovered. Note that a pre-child may have its own pre-children and/or children.

It should be understood that any of the examples herein are non-limiting. For instance, although JavaScript® is used in some of the examples, any suitable programming language may be used. As another example, exemplified herein are different states of a user interface element such as focused and hovered, however other states such as selected, pressed, listening for audio or gesture input and so forth may exist with respect to a user interface element, and thus may benefit from pre-child technology. As such, the technology described herein is not limited to any particular embodiments, aspects, concepts, structures, functionalities or examples described herein. Rather, any of the embodiments, aspects, concepts, structures, functionalities or examples described herein are non-limiting, and the present technology may be used in various ways that provide benefits and advantages in computing and user interface technology in general.

FIG. 1 is a block diagram showing example components that may use pre-child technology. In FIG. 1, an application program 102 includes a user interface tree 104. As is known with a conventional user interface tree, the user interface tree is traversed in a top-down order as appropriate for rendering user interface elements in rendering frames. However, as will be understood, a parent container may have pre-children draw before the parent container draws, and thus traversal is top-down, but the drawing (z-order) is not strictly top-down as a parent may invoke its pre-children (lower) to draw before the parent draws.

As shown in FIG. 1, the user interface tree 104 includes a higher parent 106 and a parent element 108 with its own children, as described below. Each of the children may be a parent to its own child or children, (not explicitly shown in FIG. 1).

The higher parent 106 may be a topmost parent, or may be one (of possibly many) intervening parents (not explicitly shown in FIG. 1) between the topmost parent and the parent element 108 that is represented in FIG. 1. The topmost parent element in one or more implementations is a view host that hosts at least one other "view" comprising a user interface element in the form of an object. The higher parent 106, whether the topmost parent or an intervening parent below the topmost parent, may render itself as a user interface element, e.g., a container of the parent user interface element 108.

In one or more implementations, the parent user interface element comprises a view object having code 110, general data 112 (e.g., current state data) and style data 114 comprising property values, such as element position, background color, font, font size, font color, animation data and so forth. Among other operations, the code 110 allows the parent to draw itself, to communicate with its higher parent 106, and to communicate with its children.

The exemplified parent user interface element 108 in FIG. 1 includes pre-children comprising pre-child user interface elements 116(1)-116(m), and child user interface elements 118(1)-118(n). As described herein, the parent is in control of drawing its pre-children and children, however because the pre-children and children are decoupled so as to be composable, the parent does not necessarily know anything about what its pre-children or children will do when invoked.

In general, and as is understood, an input system 120 or the like provides input to the application program 102. Non-limiting examples of input may include key input (e.g., computer keyboard input, game controller input, device remote control input), pointing device (e.g., mouse input, touch input), gesture input, eye gaze input, head tracking input, speech input and so forth. As is also known, some of the input (e.g., speech input or gesture input) may be converted (e.g., by the input system 120 including any recognition engines coupled thereto) into commands or the like before being sent to the application program 102. In general, the input impacts the tree of nodes and possibly each node's state, e.g., to allow a user to navigate among elements in the tree, e.g., to change focus/direct input to a particular item, select an item, hover over an item, scroll to see new items and so forth.

As used herein, the node that represents the user interface element in the tree, the user interface element itself (e.g., an object), and the drawn/rendered representation of that user interface element are generally interchangeable. If not specified, the context of such a term's usage may be used to distinguish between them.

As is also understood, the application program 102 traverses at least part of the tree via an application rendering system or the like, e.g., to build rendering frames for output. The output may be to a suitable output device or devices 122, e.g., an internal device display, an external coupled display such as a PC monitor, a remote monitor, a speaker, a vibration mechanism and/or the like.

To organize user interface into a tree structure, a parent with conventional "post-drawn" children (zero or more) may be specified as:

```
class UIElement {
    UIElement parent;
    List<UIElement> children;
}
```

The list may be empty or not specified if there are no children for a given parent element.

As described herein, a parent with pre-children (zero or more) and conventional children (zero or more) may be specified as:

```
class UIElement {
    UIElement parent;
    List<UIElement> preChildren;
    List<UIElement> children;
}
```

As with the children list, the preChildren list may be empty (or not specified) for a given parent element if there are no pre-children.

To draw the tree from the root node, a recursive function such as exemplified below may be used:

```
function drawTree(UIElement root) {
    foreach (prechild in root.preChildren) {
        drawTree(prechild);
    }
    root.draw( );
    foreach (child in root.children) {
        drawTree(child);
    }
}
```

As can be seen, instead of having each element draw, then each of its children elements draw in order, recursively, the recursion is the same, however for any given parent that is to draw, each of the pre-children draw before the parent and each of the children draw after the parent.

Figure 2A:
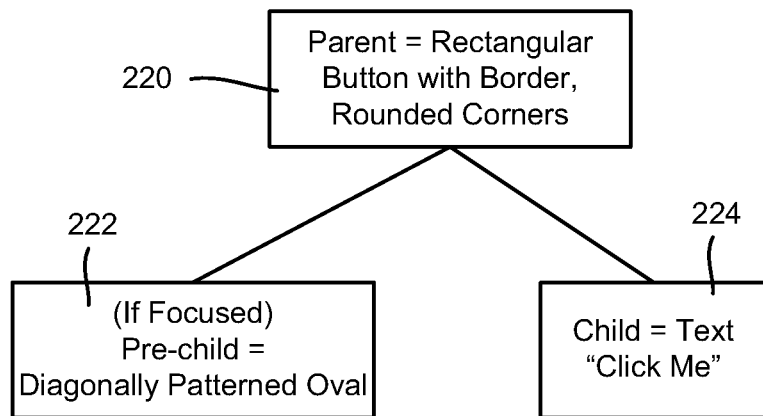
FIGS. 2A-2C are representations of an example portion of a user interface tree having a parent, pre-child and child (FIG. 2A), and showing how the tree's elements draw without focus (FIG. 2B) and with focus (FIG. 2C), according to one or more example implementations.
Figure 2B:
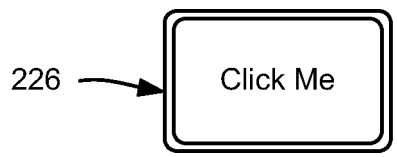
Figure 2C:
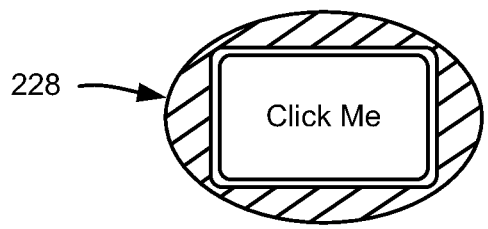

An example is shown in the partial tree of FIG. 2A, with the drawn elements represented in FIGS. 2B and 2C. FIG. 2A shows a parent element 220 representing a rectangle with rounded corners and a border, having a pre-child element 222 and a child element 224. The parent typically is associated with much more styling (appearance or other) information, such as background color, border data (e.g., white border, four pixels), font, font size, text position data and so on, however this is not shown in FIG. 2A for purposes of simplicity. Similarly, the pre-child 222 and child 224 may have additional styling data, e.g., the pre-child is configured to draw an oval of a certain size, shaded with a diagonal line fill pattern, but may have many other appearance or other property values in its style set.

In the example of FIGS. 2A-2C, the pre-child 222 is only applicable when the parent element has focus. As described herein, applicability or not may be accomplished in various ways. One way is for the parent 220 to inform its pre-child 222 of the parent's current state, whereby the pre-child 222 operates according to the current state, e.g., draws an oval if focused, or draws nothing (or draws invisibly) if not focused. Another way to determine applicability is to have a parent arranged with categories of pre-children that correspond to the parent's current state or states, e.g., the parent may have a subset of one or more "focus" pre-children that are only called if the parent has focus, a subset of one or more "hovered" pre-children that are only called if the parent is currently hovered over, a subset of one or more "selected" pre-children that are only called if the parent is selected, and so on.

The child element 224 shown in FIG. 2A is a text element having the text "Click Me" although as is understood, this child is composable and thus may be changed in the tree at any time to a different element. Further, the child may be arranged to retrieve its text from another source such as the network, so that, for example, the text may change any time the element 224 is redrawn if the source's data behind the text changes.

In the simplified example of FIGS. 2A-2C, FIG. 2B represents the button when drawn in the unfocused state, namely as the rendered button 226 alone, without the pre-child's oval being drawn. FIG. 2C represents the button when drawn in the focused state, namely as the rendered focus-highlighted button 228, with the highlight coming from the pre-child's oval being drawn before the button element and text child element. As with children, this pre-child is composable and thus may be changed in the tree at any time to a different element, e.g., to draw a hexagon highlight below the parent instead of an oval highlight. Further, the pre-child may be arranged to retrieve data from another source such as the network to obtain as at least part of what is drawn, (although likely this will not be done when used solely for highlighting purposes)

As can be seen from the above example in which the pre-child only drew as a highlight when the parent was focused, any element including a pre-child element may be state dependent. Note that as this part of the tree is rendered, a higher-level parent user interface element (not shown) erases the highlight when it draws, so that the highlight does not continue to appear if focus changes.

The pre-child user interface element may be an object (a view object) coded with logic that obtains state data from the parent, and then may base its drawing decision on the current state data. How a user interface element (including any pre-child) appears or otherwise behaves (e.g., animates) to the user depends on a set of property values referred to as the element's style.

In one or more implementations, a style thus comprises a set of property values such as color, font size, font, child position and size data, animation data and so forth. A style may be associated with each view at loading time, and may specify state-based behaviors, so as to not re-compute the user interface tree for frequent events such as focus changes, for example.

A style may be associated with a user interface element in any way, such as hardcoded into the element, or applied as needed. For example, in one or more implementations, a flexible styling system allows for rendering the same user interface element differently in different circumstances (e.g., on different platforms, or even if on the same platform, for a tablet size display versus a ten-foot display). Such a styling system provides flexibility, as one set of visual and other property values may be associated with a view object in one situation (such as when run on a smartphone platform), and a different set of visual and other property values associated with the same view object in another situation (such as when run on a gaming and entertainment system).

Regardless of how a user interface element is styled, its style properties may be state dependent. To this end, in addition to properties such as color and size, styles are able to specify transitions, such that, for example, a font may be one size when focused and another size when not focused. Such styleable transitions also allow for animations, e.g., a user interface element may animate to move and/or fade into a menu when the user first enters that menu (e.g., using entering style properties that change the element's position and/or opacity over multiple rendering frames), and then animate to move and/or fade out of the menu (using similar exiting style properties) when the user takes an action that causes the element to exit that menu.

In one or more implementations, a view object user interface element maintains states, including an "entering" state when moving into (and once moved into) a visible region, and an "exiting" state when moving out of the visible region. A style may specify different data for use in each state, including style animation data; for example, in the entering state, a view may fade into a visible region by transitioning (over a plurality of rendering frames) its opacity value to become less transparent until fully solid, and later fade out of a visible region in the exiting state by reversing this opacity transition. The view's style properties may include values for the entering state, including for the animation data (e.g., the starting and ending opacity values and the number of rendering frames or other corresponding time value), as may style properties for the exiting state.

A view also may maintain style-related data (e.g., based upon a set of Boolean flags) comprising additional information regarding the current interactive state of the view. For example, flag values may indicate when a view is 1) focused within its input scope, 2) hovered over (the view has pointer input over it), 3) listening (the view is listening for command input such as voice input and/or possibly gesture input), 4) selected (the view is active/invoked/toggled on), and/or 5) pressed (the view has either a pointer captured, or has the invoke button pressed). Each of these view states may have a style property value subset associated therewith, e.g., so that as in the above example, a view's font may be one size when focused and another size when not focused, and so on. Thus, even though a style on a view may be static in that the property values to be used for an associated view may be fixed for a runtime session, the style property set is dynamic with respect to which subset of the property values may be applied to the view at any time, based upon a current state within the variable states of a view.

It is thus understood that a pre-child user interface element may use state data that establishes how the pre-child will draw. Indeed, a straightforward decision is whether to draw at all, e.g., in FIG. 2B, the state was non-focused, so the pre-child 222 (FIG. 2A) did not draw at all (or drew invisibly). In FIG. 2C, the pre-child 222 (FIG. 2A) did draw. Although not shown, it is understood that a pre-child may have a more complex set of property values, e.g., draw a white oval when not focused, or draw an orange oval when focused. Indeed, a pre-child may be a view object and thus do anything a view object may do, possibly including to output relatively elaborate animations, audio, tactile feedback and so on; (although it should be noted that a parent may override its children to an extent, such as to have all of its children transition into and out of a container in the same way regardless of what the child property value set specifies).

Figure 3:
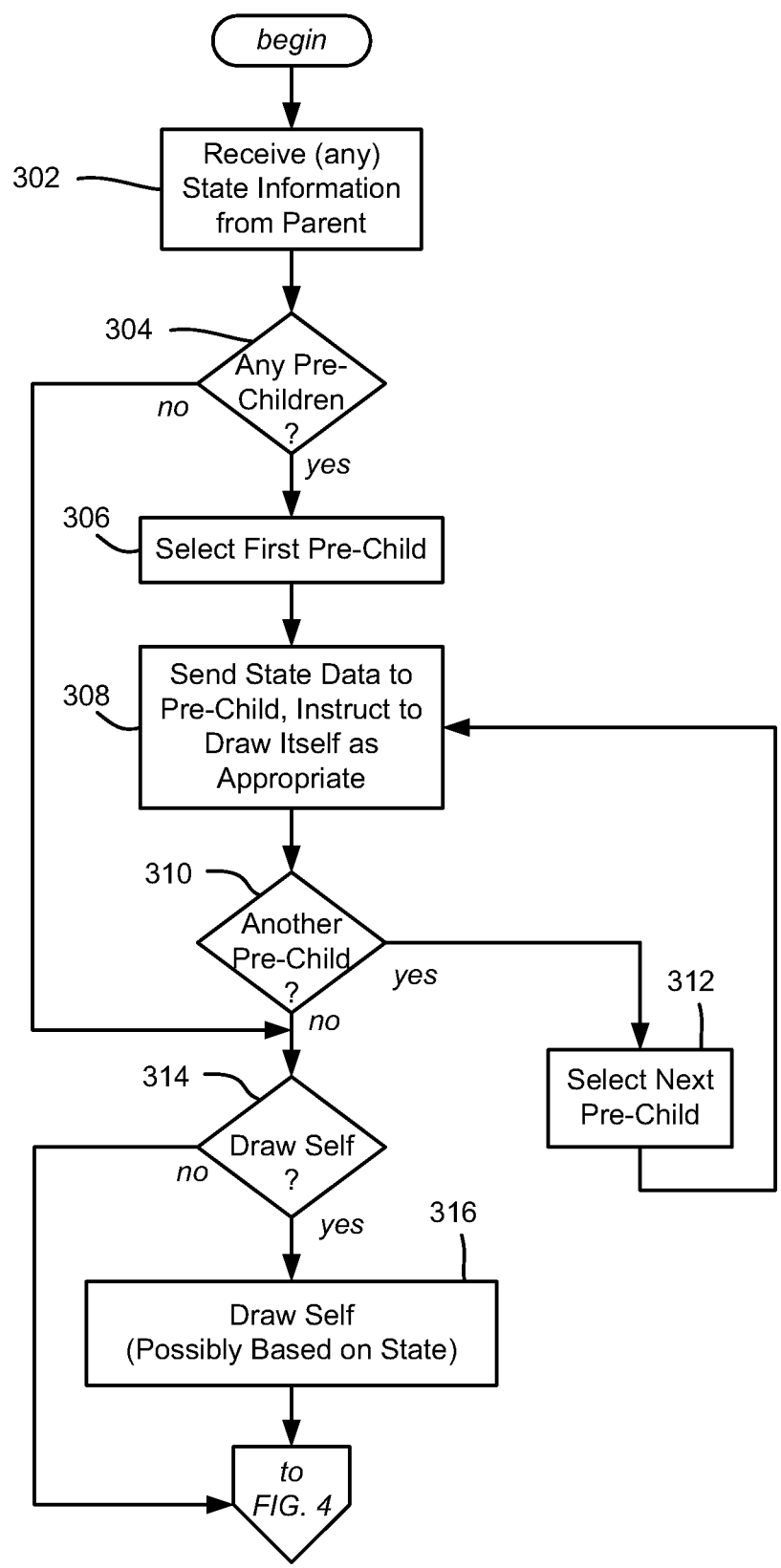
FIGS. 3 and 4 comprise a flow diagram showing example steps that may be taken by a UI element when invoked, including to invoke pre-children and children, according to one or more example implementations.
Figure 4:
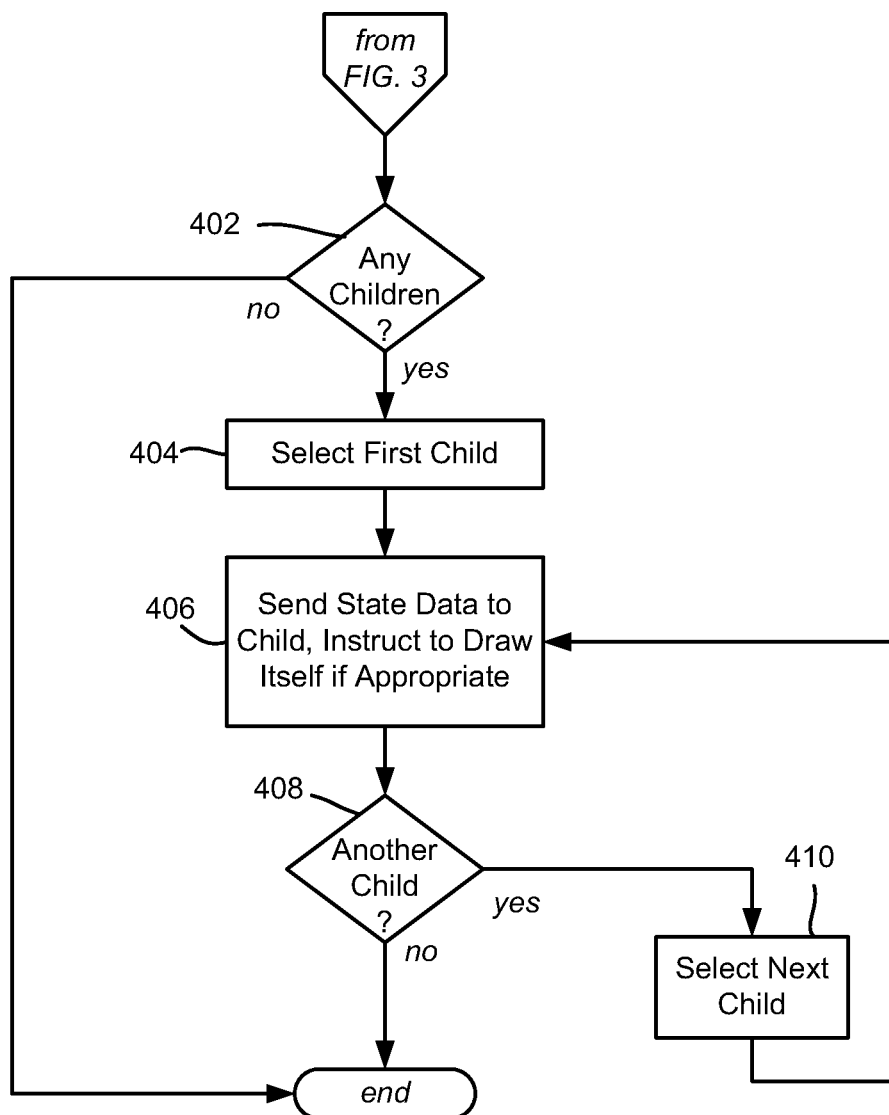

FIGS. 3 and 4 comprise a flow diagram showing example steps that may be taken with respect to drawing any pre-child user interface elements, the parent user interface element, and then any child user interface elements. It is understood that FIGS. 3 and 4 may apply to any given parent user interface element, and that each pre-child user interface element and child element (which also may be a parent) also may contain similar logic to that of FIGS. 3 and 4; that is, the logic may operate recursively.

Step 302 represents receiving any state information from a higher level parent container. Note that the highest level container, e.g., a view host, may obtain any state information from the application program, and thereby provide such information to the next lower level, if appropriate. Further, the view host may run logic similar to that of FIGS. 3 and 4.

Step 304 evaluates whether the parent that has been invoked to draw (during tree traversal) has any pre-children. If so, steps 306, 308, 310 and 312 give each pre-child the opportunity to draw. Note that based upon the state information passed at step 308, a pre-child may not draw, e.g., a pre-child may draw if the state data indicates the parent has focus, but not draw otherwise.

When any pre-children have been given the opportunity to draw, step 314 evaluates whether the parent itself draws. For example, consider that the parent is itself a pre-child (or a child) that draws or not depending on the current state data. If the parent is to draw, step 316 is executed. Otherwise this step is bypassed, and the process continues to FIG. 4.

Step 402 of FIG. 4 evaluates whether there are any children that may draw. Steps 404, 406, 408 and 410 represent giving each child an opportunity to draw. As can be seen, FIGS. 3 and 4 thus have any pre-children draw as appropriate, then the parent user interface element draw if appropriate, then any children draw as appropriate.

It should be noted that FIGS. 3 and 4 provide significant flexibility to a designer, however there are alternatives to the example logic set forth therein. For example, a rule may be in place such that unless a parent itself applies to the current state data, then no pre-children or children apply. In such a situation, it is understood that a step similar to step 314 may be used (e.g., directly following step 302) to skip over the rest of the logic and end if the parent does not apply based upon the current state data. Similarly, a rule may be in place such that unless a parent itself applies to the current state data, then no pre-children apply (but regular children may apply), whereby a step similar to step 314 may be used following step 302 to skip to FIG. 4. As another alternative, a rule may be in place such that unless a parent itself applies to the current state data, then pre-children may apply (but regular children may not), whereby something akin to the "no" branch of step 314 may end the logic instead of continuing to FIG. 4.

As another consideration, it should be noted that a parent may choose to draw only a subset of its children. For example, consider that a container has hundreds of items, and thus only a subset (e.g., twenty) may be presented at a time, with scrolling used for the user to view others. In such an event, children (and possibly pre-children) may be selectively drawn, e.g., based upon the technique of virtualization only those items that are visible need be instantiated and drawn, to conserve resources.

Figure 5:
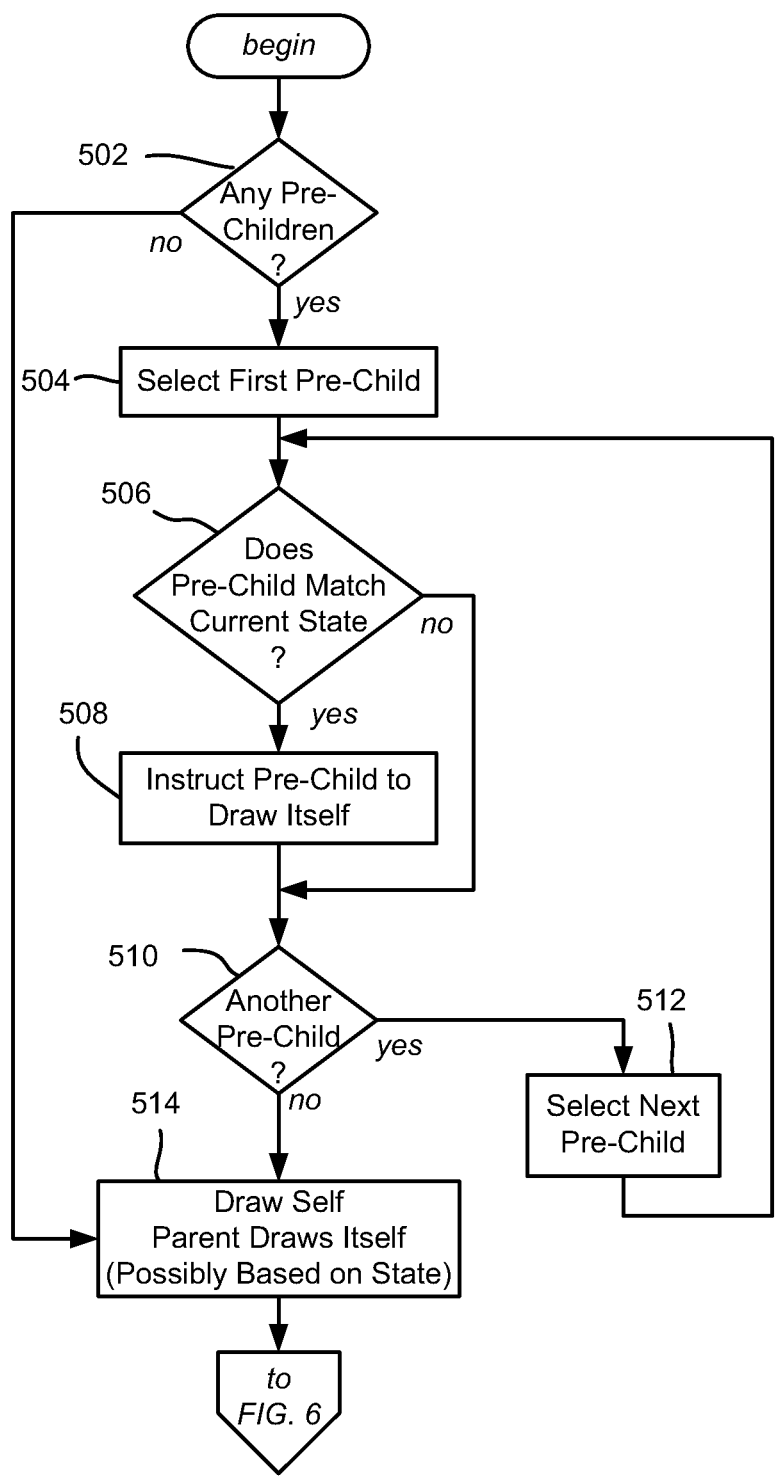
FIGS. 5 and 6 comprise a flow diagram showing example alternative steps that may be taken by a UI element when invoked to selectively invoke pre-children and children based upon state data, according to one or more example implementations.
Figure 6:
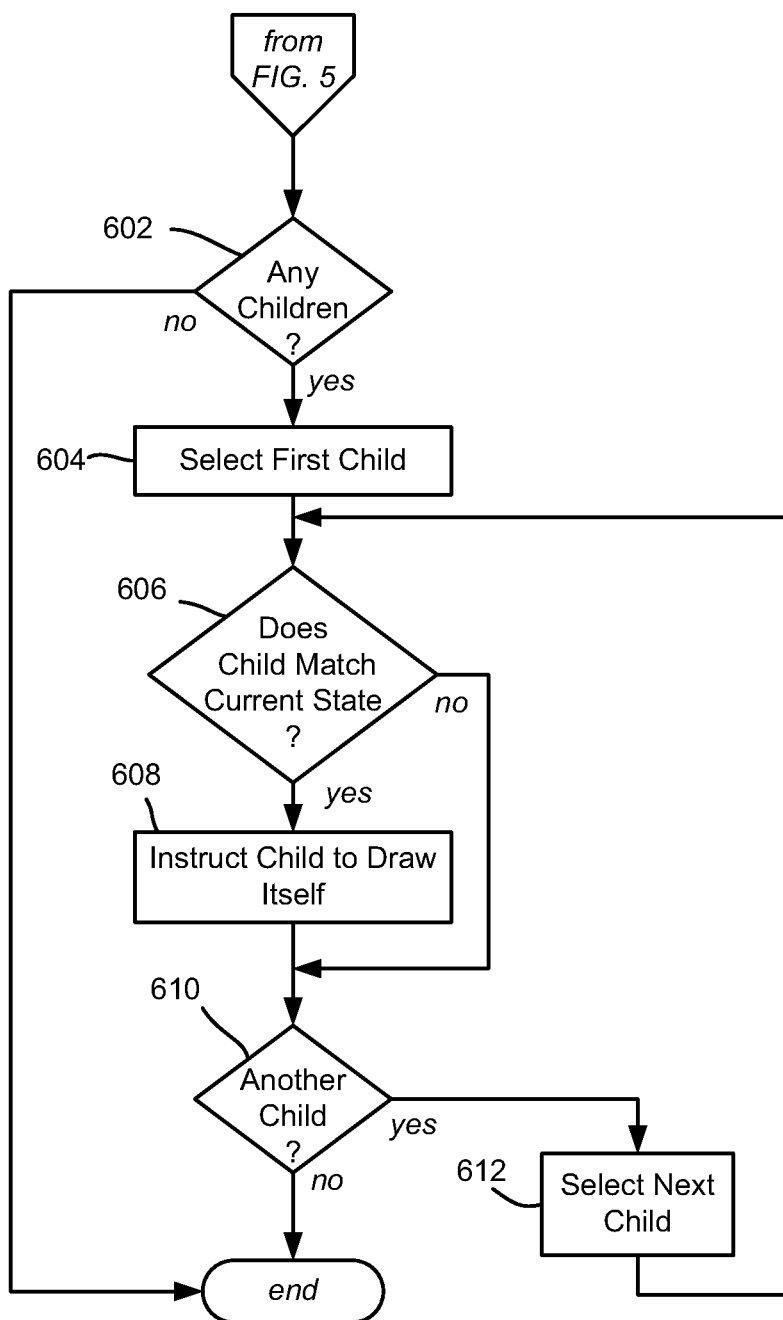

FIGS. 5 and 6 are alternative flow diagrams that are similar to FIGS. 3 and 4, however in FIGS. 5 and 6 the parent knows which of its pre-children and children apply to a given state. As described above, a feasible alternative is for a parent to have a subset of one or more "focus" pre-children that are only invoked if the parent has focus, a subset of one or more "selected" pre-children that are only called if the parent is selected, and so on. For example:

```
class UIElement {
    UIElement parent;
    List<UIElement> preChildren;
    List<UIElement> FocuspreChildren;
    List<UIElement> Selected preChildren;
    List<UIElement> children;
    List<UIElement> FocusChildren;
    List<UIElement> SelectedChildren;
}
```

In this alternative, a parent may have zero or more "general" pre-children that draw regardless of state, zero or more focus pre-children that the parent only invokes to draw if in the focused state, and/or zero or more selected pre-children that the parent only invokes to draw if in the selected state. Regular children may have a similar state-based division. Note that there may be other states, some of which are exemplified herein, e.g., hovered, listening, pressed, and so on.

Thus, if step 502 of FIG. 5 determines that there is at least one pre-child, steps 504, 506 and 508 selectively invoke only those pre-children that match the current state or states, or are listed as "general" (not state-dependent) pre-children. Note that if invoked at step 508, a pre-child also may use state data to make drawing-related decisions. Steps 510 and 512 repeat the process for any other pre-children.

Step 514 represents the parent drawing itself. Note that in this alternative, the parent (which is also a child to a higher container) is only invoked to draw if it matches the current state, or is listed as a "general" item that draws regardless of state, and thus typically draws. However, as set forth above, once invoked any element also may use state information to make drawing-related decision(s), including whether to draw at all.

FIG. 6 is similar to FIG. 5 with respect to post-drawing children. Step 602 of FIG. 6 determines that there is at least one child, and if so, steps 604, 606 and 608 selectively draw only those children that match the current state or states or are specified as "general" (not state-dependent) children to be invoked to draw. As with pre-children, if a child is invoked at step 608, the child may use state data to make drawing-related decision(s). Steps 610 and 612 repeat the process for any other children.

Note that in the alternative of FIGS. 5 and 6, because of selective invoking, a pre-child or child element may be invoked only its parent was invoked. As can be readily appreciated, this is less flexible than in FIGS. 3 and 4 in which pre-children and children may be invoked even if the parent itself does not apply to the current state.

Turning to an example tree and state-based rendered representations that may result, by way of an example, consider that a designer wants the following to be drawn for a button based upon certain states, as appropriate; (in this example, a button can only be in the selected state if also in the focused state, and cannot be both in the hovered over state and the selected state at the same time):

Neither hovered, selected nor focused=draw button
Hovered=draw button over triangle
Focused (not hovered)=draw button over oval
Hovered and Focused=draw button over oval over triangle
Selected and focused=draw button over oval; both button and oval animate to an offset position (of X+10, Y+10).

Figure 7:
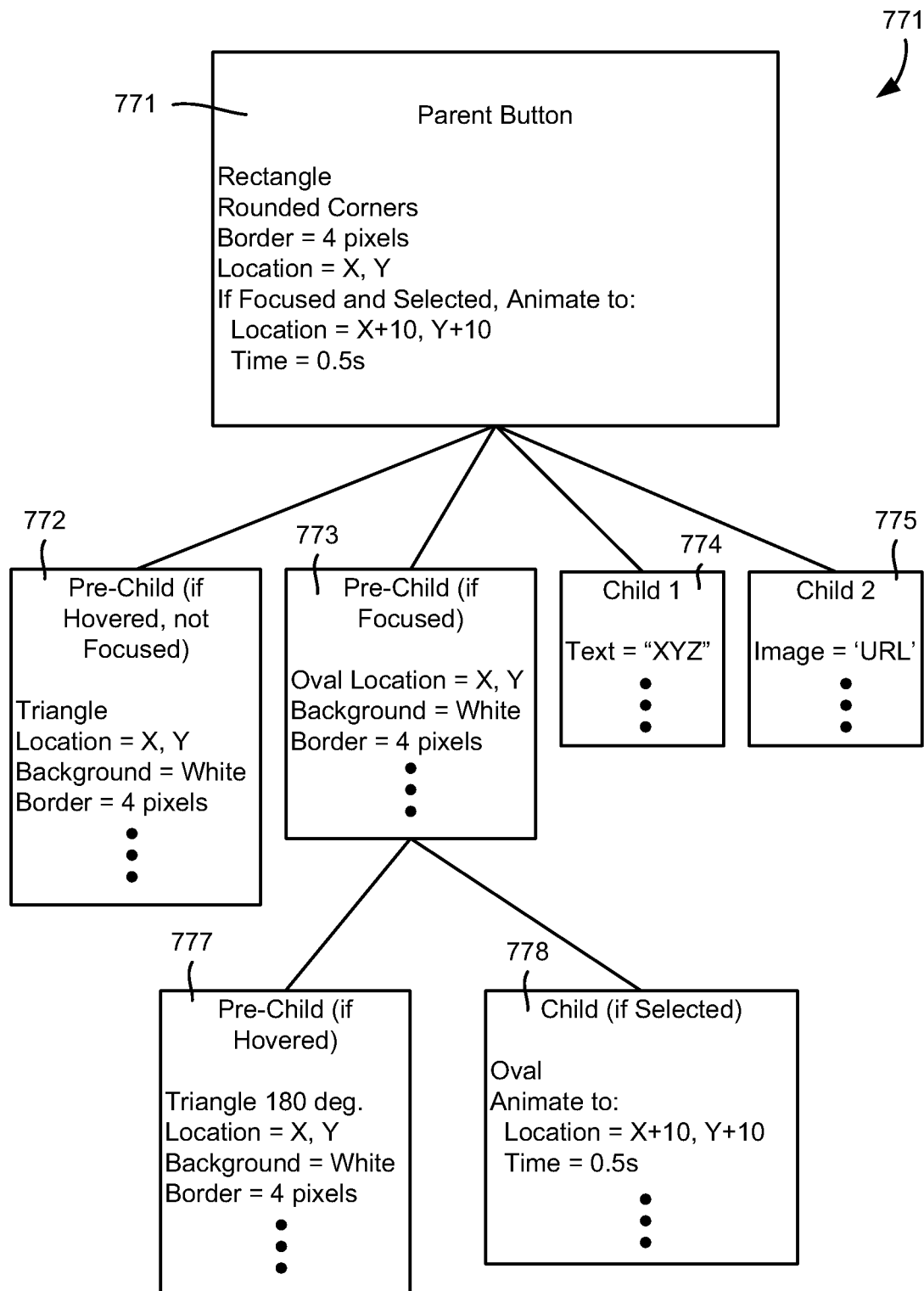
FIG. 7 is a representation of a portion of an example user interface tree in which pre-children draw or do not draw based upon current state data, according to one or more example implementations.

FIG. 7 is a portion of an example user interface tree 770 that meets the above designer specifications. The example user interface tree (portion) 770 includes a parent button element 771 that has two pre-children 772 and 773, and two children 774 and 775. As will be understood, the pre-children 772 and 773 provide the desired state-based properties, e.g., drawing (or not) based upon a focused state, hovered state and/or selected state (or none of these states).

In this example, the "if focused" pre-child 773 itself has one lower-level pre-child 777 and one child 778. Note that the represented nodes of FIG. 7 are not intended to show a full set of styling data, and are not intended to show actual code/logic that may be present, but rather contains simple language such as "if focused" or "if hovered, not focused" to convey any child or pre-child dependence on the current state or states.

Figure 8A:
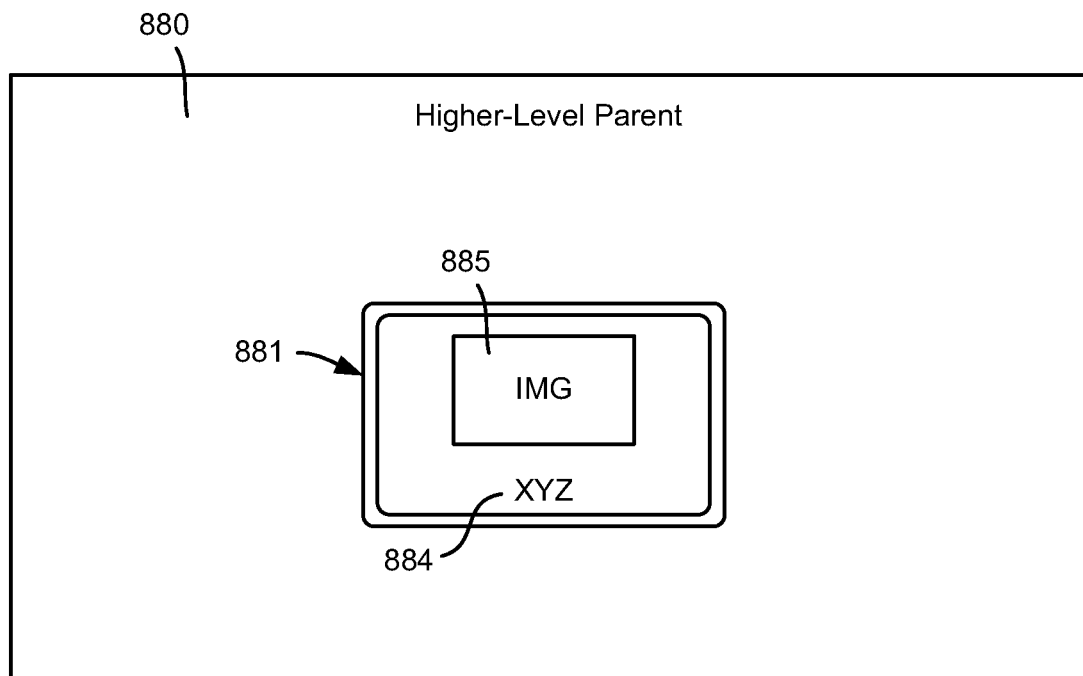
FIGS. 8A, 8B, 9A, 9B and 10 are example representations of how the example tree portion of FIG. 7 may be drawn by pre-children UI elements, the parent UI element and children UI elements, including based upon current state data, according to one or more example implementations.

Consider that the button represented by the parent button element 771 is not currently focused (and thus also not selected), and is not currently hovered over. When the tree is processed, no pre-children apply in this state, and thus the button node draws, but the button element does not have any applicable pre-children that drew before the parent. Thus, the button element 771 is drawn with its property set, and then its children 774 and 775 draw, resulting in the representation of FIG. 8A, for example, rendered within some higher-level parent container 880. As is seen the parent button element 771 draws a rectangle 881 with a border and rounded corners, the child element 774 draws text "XYZ" 884 and an image 885 is drawn, e.g., retrieved via a URL specified by the child element 775.

Figure 8B:
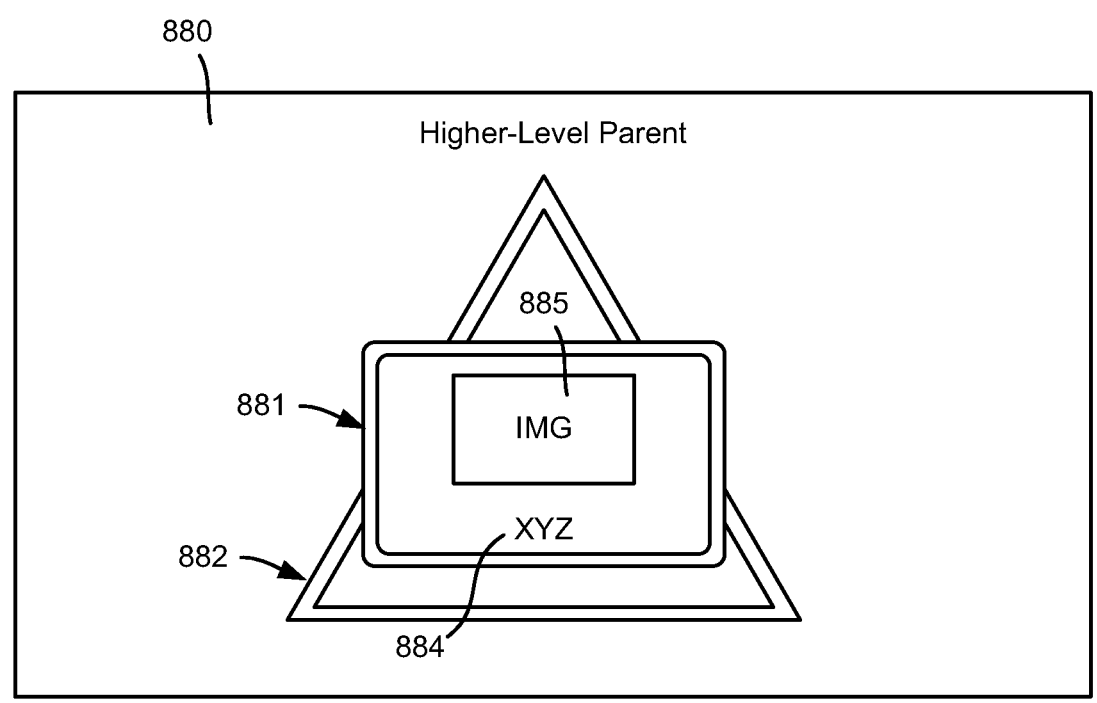

Consider that at some other time, the button is being hovered over (but is not focused). In this example, pre-child element 772 applies to this state, and thus the pre-child element 772, based upon its property set, draws the specified triangle 882 (with border) as represented in FIG. 8B, after which the button 881 is drawn with its property set (via the parent button element 771), after which the button's children 774 and 775 are drawn with their respective property sets, resulting in the text 884 and image 885 respectively.

Figure 9A:
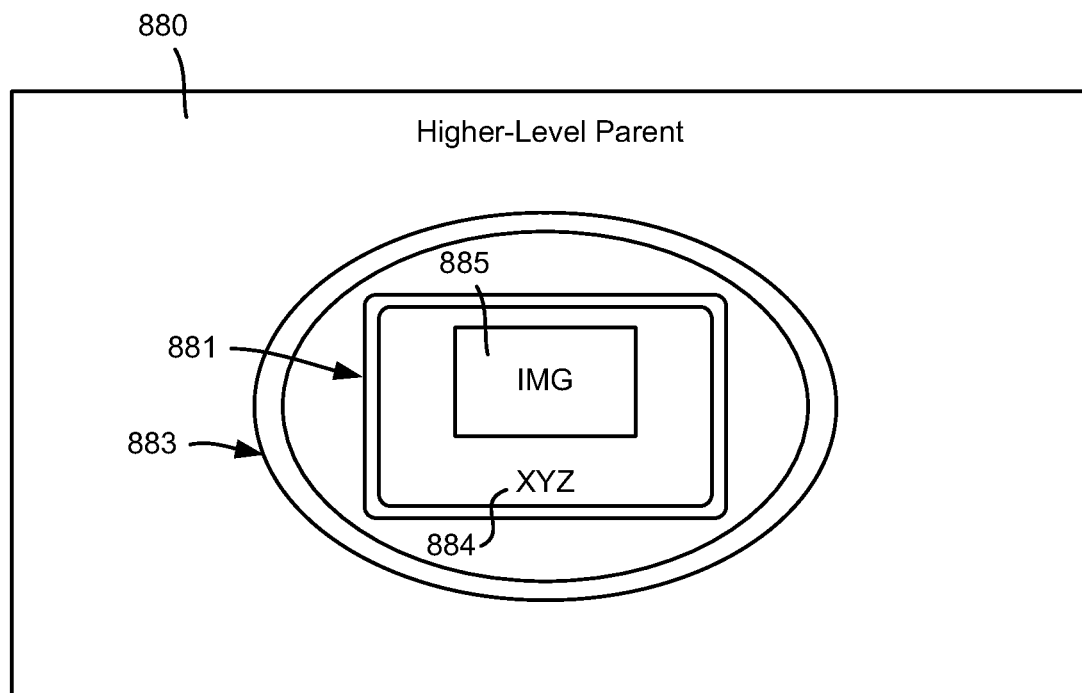
Figure 9B:
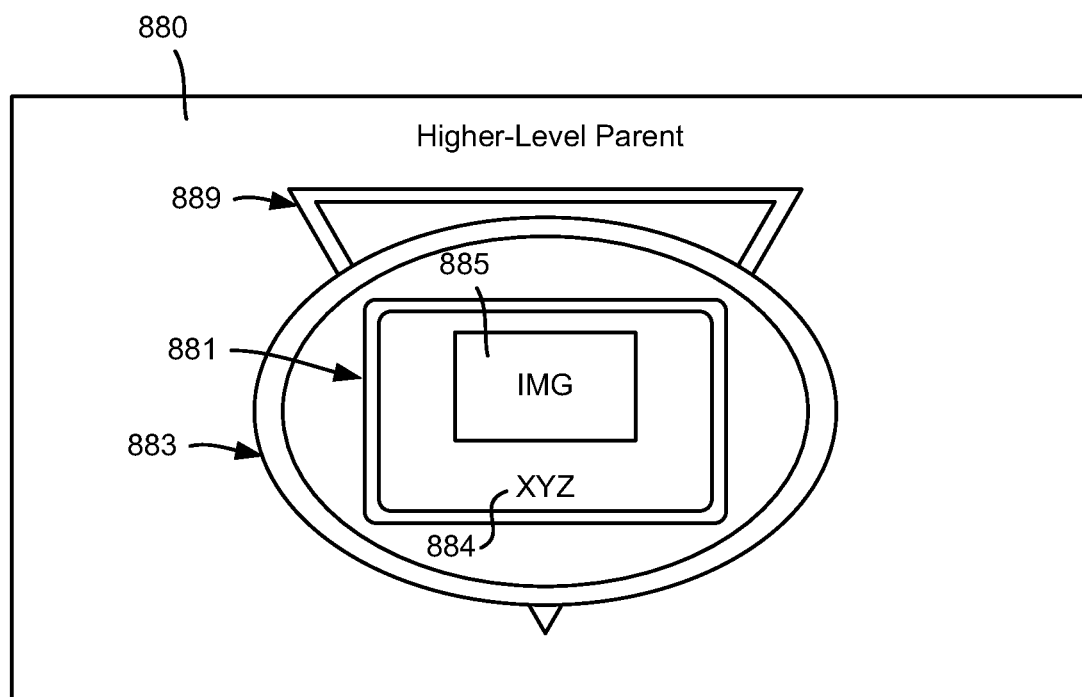

At some later time, the button has focus, but is not currently hovered over. Thus, pre-child 773 applies, which in general draws an oval 883 (with border, as shown in FIGS. 9A and 9B). Note that before the oval 883 is drawn, the lower-level pre-child 777 of the pre-child 773 does not draw, because at this time the button is not hovered over in this example. Further, after the oval 883 is drawn, the lower-level child 778 of the pre-child 773 does not draw, because the button is also not selected. The parent button element 771 then draws its rectangle, then its children 774 and 775 draw their text and image, respectively. The result thus may appear as in the representation of FIG. 9A, for example.

In another situation, the button has focus and is also currently hovered over. Thus, pre-child 772 does not apply (because of the focus), but pre-child 773 applies, which in general draws an oval 883. However, before the oval is drawn, the lower-level pre-child 777 of the pre-child 773 does draws an inverted (180 degree) triangle 889 (FIG. 9B), because the button is hovered over in this example state. Further, after the oval is drawn, the lower-level child 778 of the pre-child 773 does not draw, because the button is not selected. The parent button element 771 then draws, over the oval 883 which was drawn over the inverted triangle 889, then its children 774 and 775 draw their text 884 and image 885, respectively. The result thus may appear as in the representation of FIG. 9B, for example.

Figure 10:
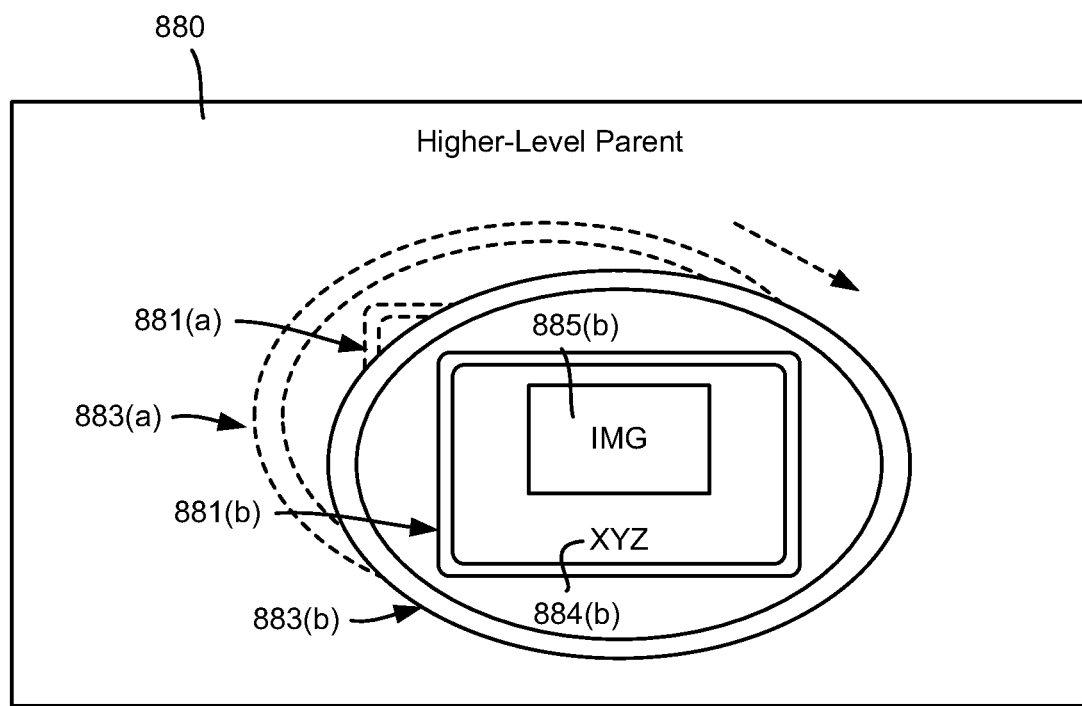

In another example, consider that the button is in the selected state (which in this example means also focused, but not hovered). Thus, pre-child 773 applies, and its lower-level child 778 applies (because selected) but lower-level pre-child 777 does not apply (because not hovered over). In this example, the parent and its children are drawn after an oval 883(*a*), FIG. 10, is drawn by the lower-level pre-child 778 of the pre-child 773. The pre-child 778 specifies an animation to move the oval to an offset of X+10, Y+10 over one-half a second, shown as the oval 883(*b*). Similarly, the button parent element has the same animation parameters when selected, and thus the button and its children "move" with the oval. Note that in a typical implementation, the pre-child sets up the animation parameters, but does not complete the animation before returning, so that the parent button animation and pre-child animation are synchronized (substantially or exactly) interpolated "movements" over a half-second's number of rendering frames in this example. The result thus may appear as in the representation of FIG. 10, for example, where the dashed lines represent the various elements' initial position (only 881(*a*) and 883(*a*)

are visible in the example of FIG. 10), and the solid lines represent a later animated, position, e.g., at the end of the animation showing the later positions of rendered elements 881(*b*), 883(*b*), 884(*b*) and 885(*b*).

As can be seen, the technology described herein uses pre-children in a user interface tree in a way that allows decoupling user interface elements from user interface elements that represent children, thereby enabling expressing composable user interfaces elegantly. The pre-children may be used to represent a highlight (e.g., a focus highlight) that draws before a parent element draws, yet the tree property remains composable.

One or more aspects are directed towards invoking a pre-child user interface element of a user interface tree, in which the pre-child includes pre-child logic for drawing a representation of a pre-child user interface element at a first time. The one or more aspects include drawing a parent user interface element at a second time that is later than the first time. A child user interface element may be invoked to draw a representation of the child user interface element at a third time that is later than the second time The pre-child logic may determine whether to draw the representation of the pre-child user interface element, including by obtaining state data at the pre-child user interface element, and by determining whether to draw the representation of the user interface element based upon the state data. The pre-child user interface element representation may be drawn as a highlight at the first time in a position that appears beneath the parent element once the parent element representation is drawn at the second time.

Invoking the pre-child user interface element may be based upon the parent user interface element determining that the pre-child user interface element is to be invoked based upon state data.

Drawing the representation of the child user interface element pre-child user interface element ma include animating the representation of the child user interface element over a plurality of rendering frames.

The pre-child user interface element may have a lower-level pre-child user interface element in the user interface tree. If so, the lower-level pre-child user interface element may be invoked. The pre-child user interface element may have a lower-level child user interface element in the user interface tree, and if so, the lower-level child user interface element may be invoked.

One or more aspects are directed towards an application program that traverses at least part of user interface tree to render representations of user interface elements corresponding to nodes of the user interface tree. This includes traversing at least part of the tree based upon input from an input system coupled to the application program having node representations of at least part of the tree rendered on an output device. A parent node in the user interface tree corresponds to a parent user interface element that when rendered appears as a representation of the parent node on the output device. A pre-child node is associated with the parent node, and corresponds to a pre-child user interface element that when rendered appears as a representation of the pre-child node on the output device. When the pre-child node draws, the pre-child node draws before the parent node draws.

The pre-child node may correspond to an invoked object containing pre-child logic that determines whether to draw based upon state data associated with the parent node. The state data may correspond to a focused state, a hovered state, a listening state, a selected state and/or a pressed state.

The pre-child node may be associated with a set of style property values that are used to determine whether to draw the representation of the pre-child node when invoked, and if so, how to draw the representation of the pre-child node. The representation of the pre-child node may be a shape that appears as a highlight relative to the representation of the parent node.

The pre-child node may have a lower-level pre-child node in the user interface tree that if invoked, draws before the pre-child node. The pre-child node may have a lower-level child node in the user interface tree that if invoked, draws after the pre-child node and before the parent node.

One or more aspects are directed towards invoking a pre-child user interface element, including providing state data to the pre-child user interface element. Described herein is determining whether to draw a representation of the pre-child user interface element based upon the state data, and if so, drawing a representation of the pre-child user interface element. Also described herein is drawing a representation of the parent user interface element after drawing the representation of the pre-child user interface element, invoking a child user interface element, and drawing a representation of the child user interface element after drawing the representation of the parent user interface element.

The pre-child user interface element may have a lower level pre-child user interface element; a determination may be made as to whether to draw a representation of the lower-level pre-child user interface element based upon the state data, and if so, to draw a representation of the lower-level pre-child user interface element before drawing the representation of the pre-child user interface element.

There may be at least one other pre-child user interface element of the parent element. If so, described herein is invoking each other pre-child user interface element, including providing state data thereto.

Drawing the representation of the pre-child user interface element may comprise drawing a highlight that is relative to the representation of the parent user interface element. Drawing the representation of the pre-child user interface element may comprise animating the representation of the pre-child user interface element in conjunction with animating the representation of the parent user interface element.

EXAMPLE COMPUTING DEVICE

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
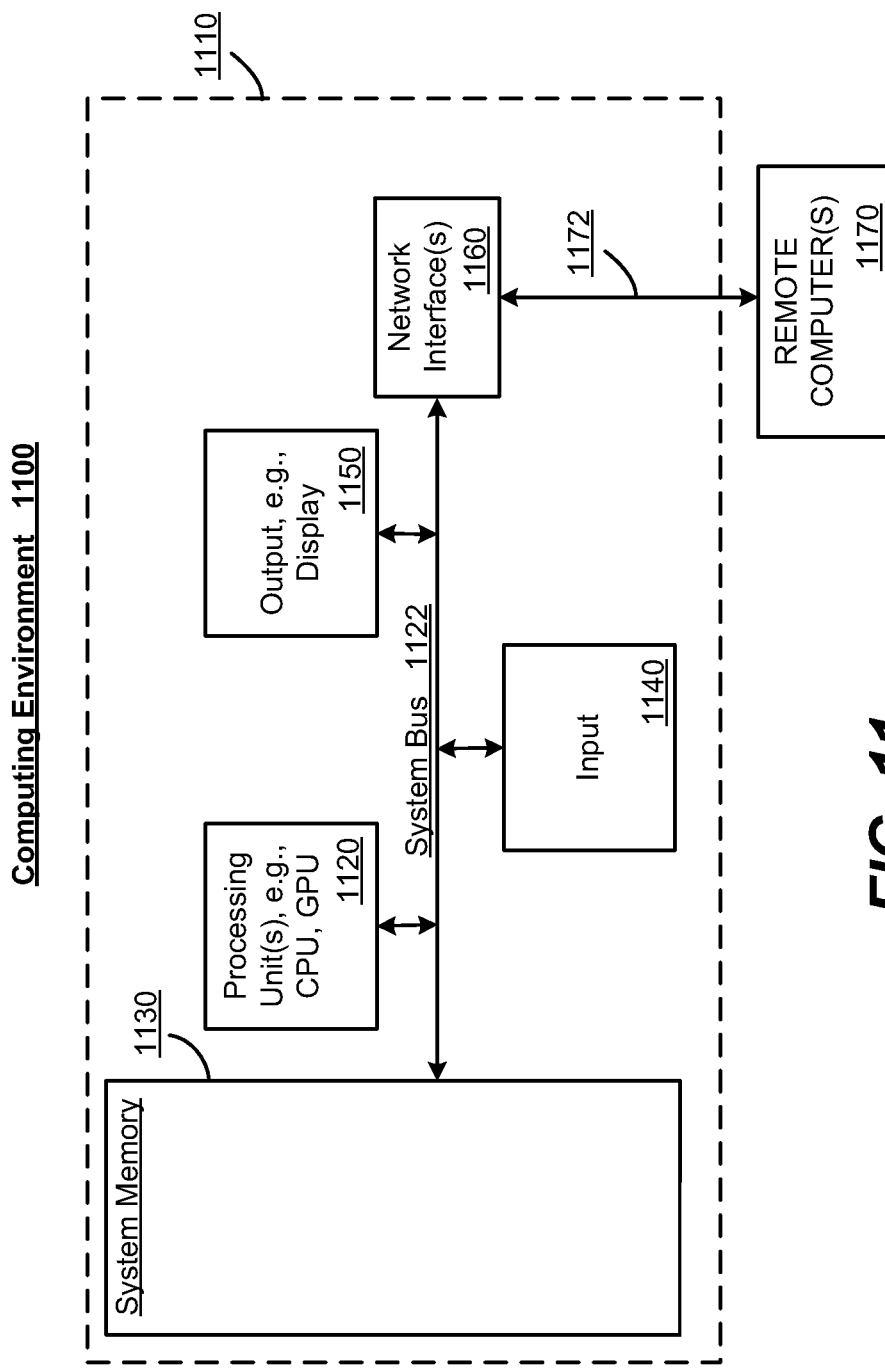
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   traversing a hierarchical tree of user interface elements, in which the hierarchical tree comprises a parent user interface element, a pre-child user interface element that depends from the parent user interface element and a child user interface element that depends from the parent user interface element;
   selecting the pre-child user interface element;
   drawing a representation of the pre-child user interface element;
   drawing a representation of the parent user interface element over the representation of the pre-child user interface element;
   selecting the child user interface element; and
   drawing a representation of the child user interface element over the representation of the parent user interface element.

2. The method of claim 1, further comprising, obtaining state data at the pre-child user interface element, and drawing the representation of the pre-child user interface element based on the state data.

3. The method of claim 1, wherein the drawing the representation of the pre-child user interface element comprises drawing the representation of the pre-child user interface element as a highlight over which the representation of the parent user interface element is drawn.

4. The method of claim 1, further comprising selecting another pre-child user interface element and drawing a representation of the other pre-child user interface element over which the representation of the parent user interface element is drawn.

5. The method of claim 1, wherein the selecting the pre-child user interface element further comprises determining via logic in the parent user interface element that the pre-child user interface element is to be selected based upon state data.

6. The method of claim 1, wherein drawing the representation of the child user interface element pre-child user interface element comprises animating the representation of the child user interface element over a plurality of rendering frames.

7. The method of claim 1 wherein the pre-child user interface element has a lower-level pre-child user interface element in the user interface tree, and further comprising, drawing the lower-level pre-child user interface element before drawing the parent user interface element.

8. The method of claim 1, further comprising selecting another child user interface element and drawing a representation of the other—child user interface element over the parent user interface element.

9. A system comprising:
   a processor; and
   a memory operatively coupled to the processor, the memory having stored therein computer-executable instructions, which when executed perform operations, the operations comprising:
   traversing a hierarchical tree of user interface elements, in which the hierarchical tree comprises a parent user interface element, a pre-child user interface element that depends from the parent user interface element and a child user interface element that depends from the parent user interface element;
   selecting the pre-child user interface element;
   drawing a representation of the pre-child user interface element; and
   drawing a representation of the parent user interface element over the representation of the pre-child user interface element.

10. The system of claim 9 wherein the pre-child user interface element contains pre-child logic that decides to draw based upon state data associated with the parent user interface element.

11. The system of claim 10 wherein the state data corresponds to at least one of: a focused state, a hovered state, a listening state, a selected state or a pressed state, or any combination of a focused state, a hovered state, a listening state, a selected state or a pressed state.

12. The system of claim 9 wherein the pre-child user interface element is associated with a set of one or more style property values, and wherein the set is used to draw the representation of the pre-child user interface element.

13. The system of claim 9 wherein the pre-child user interface element has a lower-level pre-child user interface element in the user interface tree that if invoked, draws before the pre-child user interface element.

14. The system of claim 9 wherein the pre-child user interface element has a lower-level child user interface element in the user interface tree that if invoked, draws after the pre-child user interface element and before the parent user interface element draws.

15. The system of claim 9 wherein the representation of the pre-child user interface element comprises a shape that appears as a highlight relative to the representation of the parent user interface element.

16. One or more machine-readable storage media having machine-executable instructions, which when executed, cause a system comprising a processor to perform operations, the operations comprising:
   selecting a pre-child user interface element in a hierarchical user interface tree;

providing state data to the pre-child user interface element;

determining to draw a representation of the pre-child user interface element based upon the state data, and drawing the representation of the pre-child user interface element; and drawing a representation of a parent user interface element, the parent user interface element comprising a parent to the pre-child user interface element in the hierarchical user interface tree, over the representation of the pre-child user interface element.

17. The one or more machine-readable storage media of claim 16, having further operations comprising, providing changed state data to the pre-child user interface element, drawing a changed representation of the pre-child user interface element based upon the changed state data, and re-drawing a representation of the parent user interface element over the changed representation of the pre-child user interface element.

18. The one or more machine-readable storage media of claim 16, having further operations comprising, providing changed state data to the pre-child user interface element, drawing a changed representation of the pre-child user interface element based upon the changed state data, and drawing a changed representation of the parent user interface element based upon the changed state data over the changed representation of the pre-child user interface element.

19. The one or more machine-readable media of claim 16 wherein the drawing the representation of the pre-child user interface element comprises drawing a highlight that is relative to the representation of the parent user interface element.

20. The one or more machine-readable media of claim 16 having further operations comprising animating the representation of the pre-child user interface element over a plurality of rendering frames.

* * * * *